(12) United States Patent
Zhang

(10) Patent No.: US 11,100,770 B2
(45) Date of Patent: Aug. 24, 2021

(54) SELF-ADJUSTING LED WARNING LIGHT CONTROL SYSTEM

(71) Applicant: Yuyao Feite Plastic Co., Ltd., Yuyao (CN)

(72) Inventor: Shanqin Zhang, Yuyao (CN)

(73) Assignee: Yuyao Feite Plastic Co., Ltd., Zhejiang (CN)

( * ) Notice: Subject to any disclaimer, the term of this patent is extended or adjusted under 35 U.S.C. 154(b) by 96 days.

(21) Appl. No.: 16/069,451

(22) PCT Filed: Jun. 30, 2017

(86) PCT No.: PCT/CN2017/091142
§ 371 (c)(1),
(2) Date: Jul. 11, 2018

(87) PCT Pub. No.: WO2018/223449
PCT Pub. Date: Dec. 13, 2018

(65) Prior Publication Data
US 2021/0209904 A1    Jul. 8, 2021

(30) Foreign Application Priority Data
Jun. 6, 2017    (CN) .......................... 201710418614.5

(51) Int. Cl.
*G08B 5/38* (2006.01)
*H04N 9/73* (2006.01)
(Continued)

(52) U.S. Cl.
CPC ........... *G08B 5/38* (2013.01); *G06K 9/00791* (2013.01); *H04N 7/18* (2013.01); *H04N 9/735* (2013.01)

(58) Field of Classification Search
CPC combination set(s) only.
See application file for complete search history.

(56) References Cited

U.S. PATENT DOCUMENTS 6,351,211 B1 * 2/2002 Bussard ................. B60Q 1/302
340/438
7,589,622 B2 9/2009 Farley
(Continued)

FOREIGN PATENT DOCUMENTS

CN    202080275 U    12/2011
CN    103021337 A    4/2013
(Continued)

OTHER PUBLICATIONS

The State Intellectual Property Office, The P.R. China, acting as the International Searching Authority; International Search Report for PCT/CN2017/091142; dated Mar. 5, 2018 (5 pages).
(Continued)

*Primary Examiner* — James M Anderson, II
(74) *Attorney, Agent, or Firm* — Greensfelder, Hemker & Gale, P.C.; Richard C. Himelhoch

(57) ABSTRACT

A self-adjusting LED warning light control system includes an image capturing device, an image processing device, a car distance detection device, a warning light control device, and an LED warning light. The LED warning light includes a red LED component, a middle partition, and a blue LED component. The image capturing device is provided for collecting image data for the front of the police car to obtain a front image; the image processing device is provided for performing an image processing of the front image; the car distance detection device is provided for confirming the front vehicle distance according to an output of the image processing device; the warning light control device is provided for confirming a control strategy of the LED warning light according to the output of the car distance detection device. This disclosure can achieve a self-adjusting control of the LED warning light.

8 Claims, 1 Drawing Sheet

(51) Int. Cl.
G06K 9/00 (2006.01)
H04N 7/18 (2006.01)

(56) References Cited

U.S. PATENT DOCUMENTS

| | | | | |
|---|---|---|---|---|
| 2008/0036582 | A1* | 2/2008 | Farley | B60Q 1/2615 |
| | | | | 340/468 |
| 2012/0206050 | A1* | 8/2012 | Spero | F21S 41/147 |
| | | | | 315/152 |
| 2017/0050555 | A1* | 2/2017 | Chen | F21S 41/675 |
| 2017/0075888 | A1* | 3/2017 | Ekin | G06F 16/51 |

FOREIGN PATENT DOCUMENTS

| | | | |
|---|---|---|---|
| CN | 103220852 | A | 7/2013 |
| CN | 104202881 | A | 12/2014 |
| CN | 105512623 | A | 4/2016 |
| CN | 103220852 | B | 5/2016 |

OTHER PUBLICATIONS

The State Intellectual Property Office, The P.R. China, acting as the International Searching Authority; Written Opinion for PCT/CN2017/091142; dated Mar. 5, 2018 (4 pages).

* cited by examiner

SELF-ADJUSTING LED WARNING LIGHT CONTROL SYSTEM

CROSS-REFERENCE TO RELATED APPLICATIONS

The present invention is a U.S. national stage filing of International Application No. PCT/CN2017/091142 filed Jun. 30, 2017, which claims the benefit of Chinese Application No. 201710418614.5 filed Jun. 6, 2017, the contents of which are incorporated herein by reference.

FIELD OF INVENTION

The present disclosure relates to the field of LED warning lights, in particular to a self-adjusting LED warning light control system.

BACKGROUND OF INVENTION

1. Description of the Related Art

Police lamps are used extensively as a warning sign for special occasions and also applicable for municipal administration, construction work, and contact signals and position/direction indications for guardianship, ambulance or rescue workers. In general, the police lamps are mainly in a police patrol car to remind passing vehicles and pedestrians to stay safe on the road, play a deterrent role in arresting criminals, give a sense of security to the general public, and avoid impending illegal acts.

Common police lamp products have the following features:

High Light Efficiency and Energy Saving: For example, the light source may be an ultra-bright solid-state maintenance-free LED light source with high light efficiency, long service life, and energy-saving and environmentally friendly features. The excellent core circuit design allows users to switch the sound and sound/light modes freely, and the sound intensity of siren is up to 115 decibels, which gives powerful penetrations. Rechargeable batteries such as a high-power memoryless battery pack with stable charge/discharge performance, high capacity, low self-discharge rate, energy saving and environmentally friendly.

Safe and Reliable: Advanced optical software and optimal structural sealing design may be adopted, and the housing is made of an imported engineering plastic material capable of bearing strong collisions and impacts to assure a stable and reliable operation of the police lamp in harsh environments.

Convenient to Use: The police lamp has the features of small volume, light weight, and convenient to carry. The police lamp may be placed on a table, hand carried, or magnetically attached.

However, the conventional police lamp having a simpler structure with less function can no longer meet the increasingly higher police patrol requirements.

2. Summary of the Invention

Therefore, it is a primary objective of this disclosure to overcome the aforementioned drawbacks of the prior art by providing a self-adjusting LED warning light control system having a customized high-precision image detection mechanism to detect the front vehicle distance of the nearest car from a police car accurately and confirm a correct control strategy of the LED warning light according to the front vehicle distance, wherein the larger the front vehicle distance, the quicker the flash frequency of the red LED component of the LED warning light, and the slower the flash frequency of the red LED component of the LED warning light.

In another aspect, this disclosure further provides a self-adjusting LED warning light control system comprising an image capturing device, an image processing device, a car distance detection device, a warning light control device, and an LED warning light, and the LED warning light comprising a red LED component, a middle partition and a blue LED component, and the image capturing device being used for collecting image data of the front of the police car to obtain a front image, and the image processing device being coupled to the image capturing device for performing an image processing of the front image, and the car distance detection device being coupled to the image processing device for confirming a front vehicle distance according to an output of the image processing device.

Wherein, the warning light control device is coupled to the car distance detection device and the LED warning light for confirming a control strategy of the LED warning light according to the output of the car distance detection device.

Specifically, the display device of the self-adjusting LED warning light control system is installed in a dashboard disposed at the front end of a police car and coupled to the warning light control device, for receiving and instantly displaying the front vehicle distance.

Specifically, the self-adjusting LED warning light control system further comprises a frequency division duplexing communication interface installed onto a police car body and coupled to the warning light control device for receiving the front vehicle distance and transmitting the front vehicle distance to a remote management control center via wireless transmission by a bidirectional wireless communication chain.

Specifically, the self-adjusting LED warning light control system further comprises a light intensity detection device installed onto the police car body for detecting the light intensity around the police car to output an instant light intensity.

Specifically, the self-adjusting LED warning light control system further comprises a light intensity change rate detection device coupled to the light intensity detection device for detecting a change of rate of the instant light intensity, and if the change of rate of the instant light intensity is greater than or equal to a predetermined threshold of change of rate, then a too-high change rate signal will be sent out, or else a normal change rate signal will be sent out; the image capturing device comprising a self-adjusting sensor installed to a police car body and coupled to the light intensity change rate detection device, and the self-adjusting sensor comprising a primitive data reading device and each primitive data capturing device, and each primitive data capturing device comprising a plurality of parallel CCD sensing units, such that when the normal change rate signal is received, each primitive data capturing device just uses and outputs the data sensed by one CCD sensing unit of the plurality of parallel CCD sensing units, and when the too-high change rate signal is received, each primitive data capturing device merges and then outputs the data sensed by the plurality of parallel CCD sensing units, and the primitive data reading devices are coupled to the primitive data capturing devices respectively for reading the data outputted by the primitive data capturing devices as the primitive value of each primitive, and the primitive value of each primitive is composed to form the front image; the image processing device comprising: a white balance processing sub-device, for receiving front image, and performing a self-adjusting white balance processing of the front image to obtain a white balance image; a parameter fetching sub-device, coupled to the white balance processing sub-device, for receiving white balance image, and confirming a mean square error of the white balance image primitive value according to the primitive value of each primitive of the white balance image as a target mean square error output to analyze the noise of the white balance image, so as to obtain three main noise signals with the top three noise amplitudes, and confirming a signal-to-noise ratio of the white balance image as a target signal-to-noise ratio outputted according to three main noise signals and white balance image; an embedded processor chip coupled to the parameter fetching sub-device for receiving the target mean square error and the target signal-to-noise ratio, and if the target signal-to-noise ratio is smaller than or equal to predetermined signal-to-noise ratio threshold, and the target mean square error is greater than or equal to predetermined mean square error threshold, then a fine filter signal will be issued, or else a rough filter signal will be issued; a fine filter sub-device, coupled to the embedded processor chip, for triggering a wave filtering operation of the white balance image when the fine filter signal is received, and the specific wave filtering operation is to perform a wavelet decomposition of the white balance image to obtain four sub-bands LL, LH, HL and HH, and confirm the mean of the HH sub-band, and calculate an optimal threshold of a wavelet shrinkage according to the mean, perform a wavelet reconstruction of the white balance image according to the optimal threshold of the wavelet shrinkage to obtain a filter image outputted from the fine filter sub-device; a rough filter sub-device, coupled to the embedded processor chip, for triggering a wave filtering operation of the white balance image when a rough filter signal is received, and a specific wave filtering operation is to perform a linear filter processing to obtain a filter image outputted from the rough filter sub-device when the white balance image is received; the car distance detection device is coupled to the fine filter sub-device and the rough filter sub-device, for receiving the filter image outputted from the fine filter sub-device or the rough filter sub-device, and performing the nearest car body identification of the filter image to obtain the nearest car body sub-image, and confirming the front vehicle distance according to the depth of field of the filter image in the nearest car body sub-image; wherein the warning light control device 4 confirms a control strategy of the LED warning light according to the output of the car distance detection device, and the control strategy includes: the larger the front vehicle distance, the quicker the flash frequency of the red LED component of the LED warning light, and the slower the flash frequency of the red LED component of the LED warning light.

Specifically, the white balance processing sub-device, the parameter fetching sub-device, the embedded processor chip, the fine filter sub-device and the rough filter sub-device of the self-adjusting LED warning light control system are integrated onto an integrated circuit board.

Specifically, the white balance processing sub-device, the parameter fetching sub-device, the embedded processor chip, the fine filter sub-device and the rough filter sub-device of the self-adjusting LED warning light control system are implemented by different chip-on-chips respectively.

DESCRIPTION OF THE EMBODIMENTS

To understand the technical characteristics of this disclosure intuitively and comprehensively, exemplary embodiments are used and illustrated in referenced figures of the drawings. It is intended that the embodiments and figures disclosed herein are to be considered illustrative rather than restrictive.

A police lamp comes with two colors including red and blue for the following main reasons:

1. Red color is a primary color of the warm color series and has a warning effect, and blue color is a primary color of the cold color series and has a sharp contrast with the red color and thus attracting more attention.

2. These colors have strong light penetration nighttime.

3. Red color is eye-catching, and even people with color blindness can distinguish red from blue.

4. About feeling, psychologists have conducted a tolerance test, wherein hot water and cold water are filled into two separated tubes, and then these two tubes are crossed, so that when people touch the intersection of these tubes by hands, both coldness and hotness can be felt simultaneously. It was found that people can bear the cold tube or the hot tube, but the intersected tubes bring tremendous stimuli to our sense. This phenomenon can be explained from the perspective of psychology. The contrast of these two feeling elements gives a big hint, and red and blue colors are exactly two opposite colors, which are similar to the cold water and hot water. Red is a primary color of the warm color series and has a warning effect, and blue is a primary color of the cold color series and has a sharp contrast with the red color and catches more attention.

In prior art, the police lamp of the police car is just used for the warning effect and the present existing hardware structure fail to provide more police functions. To overcome the deficiencies, this disclosure provides a self-adjusting LED warning light 5 control system.

Figure 1:
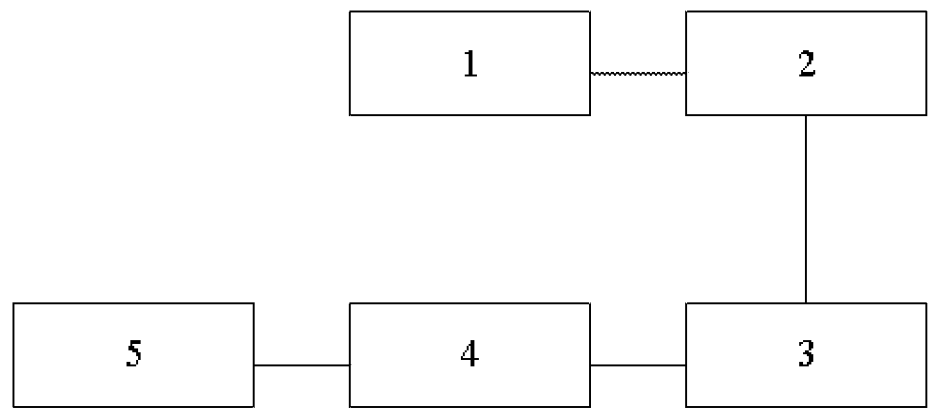
FIG. 1 is a schematic block diagram of a self-adjusting LED warning light control system in accordance with an embodiment of this disclosure.
Figure 2:
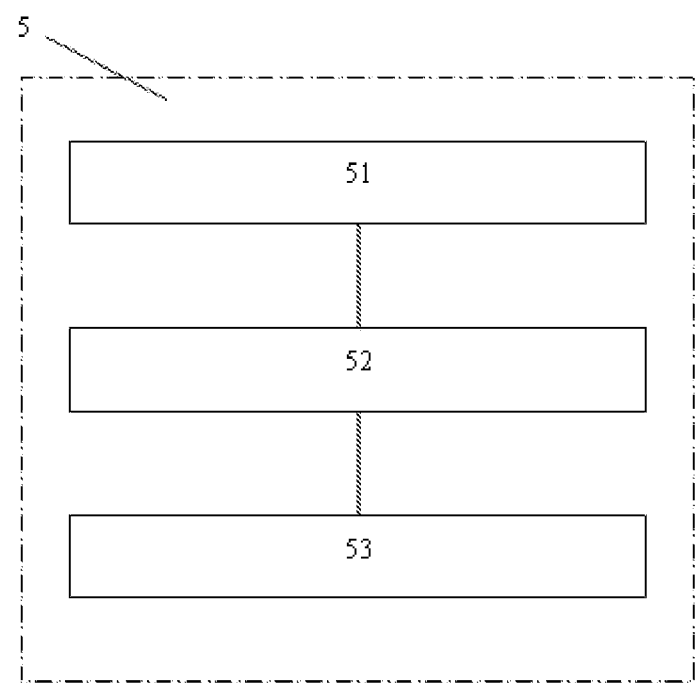
FIG. 2 is a schematic block diagram of an LED warning light of a self-adjusting LED warning light control system in accordance with an embodiment of this disclosure.

With reference to FIG. 1 for a schematic block diagram of a self-adjusting LED warning light 5 control system in accordance with an embodiment of this disclosure, the system comprises an image capturing device 1, an image processing device 2, a car distance detection device 3, a warning light control device 4, and an LED warning light 5. In FIG. 2, the LED warning light 5 comprises a red LED component 51, a middle partition 52, and a blue LED component 53, and the image capturing device 1 being used for collecting image data of the front of the police car to obtain a front image, and the image processing device 2 being coupled to the image capturing device 1 for performing an image processing of the front image, and the car distance detection device 3 being coupled to the image processing device 2 for confirming a front vehicle distance according to an output of the image processing device 2.

Wherein, the warning light control device 4 is coupled to the car distance detection device 3 and the LED warning light 5 for confirming a control strategy of the LED warning light 5 according to the output of the car distance detection device 3.

The structure of the self-adjusting LED warning light 5 control system of this disclosure is further described in details below.

The self-adjusting LED warning light 5 control system further comprises a display device installed in a dashboard disposed at the front end of the police car and coupled to the warning light control device 4 for receiving and instantly displaying the front vehicle distance.

The self-adjusting LED warning light 5 control system further comprises a frequency division duplexing communication interface installed onto a police car body and coupled to the warning light control device 4 for receiving the front vehicle distance and transmitting the front vehicle distance to a remote management control center via wireless transmission by a bidirectional wireless communication chain.

The self-adjusting LED warning light 5 control system further comprises a light intensity detection device installed onto the police car body for detecting the light intensity around the police car to output an instant light intensity.

The self-adjusting LED warning light 5 control system further comprises a light intensity change rate detection device coupled to the light intensity detection device for detecting a change of rate of the instant light intensity, and if the change of rate of the instant light intensity is greater than or equal to a predetermined threshold of change of rate, then a too-high change rate signal will be sent out, or else a normal change rate signal will be sent out; the image capturing device 1 comprising a self-adjusting sensor installed to a police car body and coupled to the light intensity change rate detection device, and the self-adjusting sensor comprising a primitive data reading device and each primitive data capturing device, and each primitive data capturing device comprising a plurality of parallel CCD sensing units, such that when the normal change rate signal is received, each primitive data capturing device just uses and outputs the data sensed by one CCD sensing unit of the plurality of parallel CCD sensing units, and when the too-high change rate signal is received, each primitive data capturing device merges and then outputs the data sensed by the plurality of parallel CCD sensing units, and the primitive data reading devices are coupled to the primitive data capturing devices respectively for reading the data outputted by the primitive data capturing devices as the primitive value of each primitive, and the primitive value of each primitive is composed to form the front image; the image processing device 2 comprising: a white balance processing sub-device, for receiving front image, and performing a self-adjusting white balance processing of the front image to obtain a white balance image; a parameter fetching sub-device, coupled to the white balance processing sub-device, for receiving white balance image, and confirming a mean square error of the white balance image primitive value according to the primitive value of each primitive of the white balance image as a target mean square error output to analyze the noise of the white balance image, so as to obtain three main noise signals with the top three noise amplitudes, and confirming a signal-to-noise ratio of the white balance image as a target signal-to-noise ratio outputted according to three main noise signals and white balance image; an embedded processor chip coupled to the parameter fetching sub-device for receiving the target mean square error and the target signal-to-noise ratio, and if the target signal-to-noise ratio is smaller than or equal to predetermined signal-to-noise ratio threshold, and the target mean square error is greater than or equal to predetermined mean square error threshold, then a fine filter signal will be issued, or else a rough filter signal will be issued; a fine filter sub-device, coupled to the embedded processor chip, for triggering a wave filtering operation of the white balance image when the fine filter signal is received, and the specific wave filtering operation is to perform a wavelet decomposition of the white balance image to obtain four sub-bands LL, LH, HL and HH, and confirm the mean of the HH sub-band, and calculate an optimal threshold of a wavelet shrinkage according to the mean, perform a wavelet reconstruction of the white balance image according to the optimal threshold of the wavelet shrinkage to obtain a filter image outputted from the fine filter sub-device; a rough filter sub-device, coupled to the embedded processor chip, for triggering a wave filtering operation of the white balance image when a rough filter signal is received, and a specific wave filtering operation is to perform a linear filter processing to obtain a filter image outputted from the rough filter sub-device when the white balance image is received; the car distance detection device 3 is coupled to the fine filter sub-device and the rough filter sub-device, for receiving the filter image outputted from the fine filter sub-device or the rough filter sub-device, and performing the nearest car body identification of the filter image to obtain the nearest car body sub-image, and confirming the front vehicle distance according to the depth of field of the filter image in the nearest car body sub-image; wherein the warning light control device 4 confirms a control strategy of the LED warning light 5 according to the output of the car distance detection device 3, and the control strategy includes: the larger the front vehicle distance, the quicker the flash frequency of the red LED component 51 of the LED warning light 5, and the slower the flash frequency of the red LED component 51 of the LED warning light 5.

In addition, the white balance processing sub-device, the parameter fetching sub-device, the embedded processor chip, the fine filter sub-device and the rough filter sub-device of the self-adjusting LED warning light 5 control system are installed in the dashboard at the front end of the police car.

In addition, the white balance processing sub-device, the parameter fetching sub-device, the embedded processor chip, the fine filter sub-device and the rough filter sub-device of the self-adjusting LED warning light 5 control system are integrated on an integrated circuit board.

In addition, the white balance processing sub-device, the parameter fetching sub-device, the embedded processor chip, the fine filter sub-device and the rough filter sub-device of the self-adjusting LED warning light 5 control system are implemented by different chip-on-chips respectively.

Wherein, image filtering is to suppress the noise of a target chart while maintaining the detailed characteristics as much as possible and the image filtering is a necessary operation in image pre-processing, and the result of the processing effect directly affects the validity and reliability of subsequent image processing and analysis.

Due to the imperfect imaging system, transmission medium, and recording equipment, digital images are usually contaminated by different noises during the process of forming, transmitting, and recording the digital images. In addition, noises may not be introduced an image object resulted from the image processing as expected. These noises are always expressed in the image as an isolated pixel or block with a stronger visual effect. In general, noise signals and studied objects are not related to their occurrence in form of useless information, or the observable information of interfered images. As to digital image signals, noises have large or small limits, and these limits are acted in the true gray value of image elements through addition and subtraction, and thus causing interferences of bright and dark dots in the image, lowering the image quality, and affecting the subsequent work such as image restoration, segmentation, feature extraction, image recognition, etc. The following two basic problems must be taken into consideration to create an effective noise suppressing filter. 1. The noises in the target and background must be removed effectively. 2. The shape, size and specific geometrical and topological structure characteristics of image target must protected.

Nonlinear filter is one of the common image filtering modes. When signal spectra and noise spectra are mixed or overlapped, or a signal has non-overlapped noises such as noises caused by the nonlinearity of a system or non-Gaussian noises, etc. traditional linear filtering technology such as Fourier transform always blurs the details (such as edges) of an image in some way while filtering the noises, so as to reduce the positioning precision of the linear feature of an image and the extractability of the feature. The nonlinear filter can always substantially map a specific noise to zero to maintain the main features of the signal according to a nonlinear mapping correspondence of an input signal, and thus overcoming the deficiency of the linear filter to a certain extent.

The self-adjusting LED warning light 5 control system of this disclosure aims at the single function of the conventional police lamp and integrates a plurality of high-precision image processing devices 2 into the police lamp to recognize the front vehicle distance from a police car to achieve different display modes of the LED warning light 5 according to the recognition result, so as to meet the requirements of the police unit and personnel.

While this disclosure has been described by means of specific embodiments, numerous modifications and variations could be made thereto by those skilled in the art without departing from the scope and spirit of the invention set forth in the claims.

What is claimed is:

1. A self-adjusting light-emitting diode (LED) warning light control system, comprising an image capturing device, an image processing device, a car distance detection device, a warning light control device, and an LED warning light, and the LED warning light comprising a red LED component, a middle partition and a blue LED component, and the image capturing device being used for collecting image data of the front of a police car to obtain a front image, and the image processing device being coupled to the image capturing device for performing an image processing of the front image, and the car distance detection device being coupled to the image processing device for confirming a front vehicle distance according to an output of the image processing device; wherein the warning light control device is coupled to the car distance detection device and the LED warning light for confirming a control strategy of the LED warning light according to the output of the car distance detection device.

2. The self-adjusting LED warning light control system of claim 1, further comprising a display device installed in a dashboard disposed at the front end of the police car and coupled to the warning light control device for receiving and instantly displaying the front vehicle distance.

3. The self-adjusting LED warning light control system of claim 2, further comprising a frequency division duplexing communication interface installed onto a police car body and coupled to the warning light control device for receiving the front vehicle distance and transmitting the front vehicle distance to a remote management control center via wireless transmission by a bidirectional wireless communication chain.

4. The self-adjusting LED warning light control system of claim 3, further comprising a light intensity detection device installed onto the police car body for detecting the light intensity around the police car to output an instant light intensity.

5. The self-adjusting LED warning light control system of claim 4, further comprising a light intensity change rate detection device coupled to the light intensity detection device for detecting a change of rate of the instant light intensity, and if the change of rate of the instant light intensity is greater than or equal to a predetermined threshold of change of rate, then a too-high change rate signal will be sent out, or else a normal change rate signal will be sent out; the image capturing device comprising a self-adjusting sensor installed to a police car body and coupled to the light intensity change rate detection device, and the self-adjusting sensor comprising a primitive data reading device and each primitive data capturing device, and each primitive data capturing device comprising a plurality of parallel CCD sensing units, such that when the normal change rate signal is received, each primitive data capturing device just uses and outputs the data sensed by one CCD sensing unit of the plurality of parallel CCD sensing units, and when the too-high change rate signal is received, each primitive data capturing device merges and then outputs the data sensed by the plurality of parallel CCD sensing units, and the primitive data reading devices are coupled to the primitive data capturing devices respectively for reading the data outputted by the primitive data capturing devices as the primitive value of each primitive, and the primitive value of each primitive is composed to form the front image; the image processing device comprising:

a white balance processing sub-device, for receiving front image, and performing a self-adjusting white balance processing of the front image to obtain a white balance image; a parameter fetching sub-device, coupled to the white balance processing sub-device, for receiving white balance image, and confirming a mean square error of the white balance image primitive value according to the primitive value of each primitive of the white balance image as a target mean square error output to analyze the noise of the white balance image, so as to obtain three main noise signals with the top three noise amplitudes, and confirming a signal-to-noise ratio of the white balance image as a target signal-to-noise ratio outputted according to three main noise signals and white balance image; an embedded processor chip coupled to the parameter fetching sub-device for receiving the target mean square error and the target signal-to-noise ratio, and if the target signal-to-noise ratio is smaller than or equal to predetermined signal-to-noise ratio threshold, and the target mean square error is greater than or equal to predetermined mean square error threshold, then a fine filter signal will be issued, or else a rough filter signal will be issued; a fine filter sub-device, coupled to the embedded processor chip, for triggering a wave filtering operation of the white balance image when the fine filter signal is received, and the specific wave filtering operation is to perform a wavelet decomposition of the white balance image to obtain four sub-bands LL, LH, HL and HH, and confirm the mean of the HH sub-band, and calculate an optimal threshold of a wavelet shrinkage according to the mean, perform a wavelet reconstruction of the white balance image according to the optimal threshold of the wavelet shrinkage to obtain a filter image outputted from the fine filter sub-device; a rough filter sub-device, coupled to the embedded processor chip, for triggering a wave filtering operation of the white balance image when a rough filter signal is received, and a specific wave filtering operation is to perform a linear filter processing to obtain a filter image outputted from the rough filter sub-device when the white balance image is received; the car distance detection device is coupled to the fine filter sub-device and the rough filter sub-device, for receiving the filter image outputted from the fine filter sub-device or the rough filter sub-device, and performing the nearest car body identification of the filter image to obtain the nearest car body sub-image, and confirming the front vehicle distance according to the depth of field of the filter image in the nearest car body sub-image; wherein the warning light control device confirms a control strategy of the LED warning light according to the output of the car distance detection device, and the control strategy includes: the larger the front vehicle distance, the quicker the flash frequency of the red LED component of the LED warning light, and the slower the flash frequency of the red LED component of the LED warning light.

6. The self-adjusting LED warning light control system of claim 5, wherein the white balance processing sub-device, the parameter fetching sub-device, the embedded processor chip, the fine filter sub-device and the rough filter sub-device are installed in the dashboard at the front end of the police car.

7. The self-adjusting LED warning light control system of claim 6, wherein the white balance processing sub-device, the parameter fetching sub-device, the embedded processor chip, the fine filter sub-device and the rough filter sub-device are integrated onto an integrated circuit board.

8. The self-adjusting LED warning light control system of claim 5, wherein the white balance processing sub-device, the parameter fetching sub-device, the embedded processor chip, the fine filter sub-device and the rough filter sub-device are implemented by different chip-on-chips respectively.

* * * * *